US012674977B2

(12) United States Patent
Debnath et al.

(10) Patent No.: US 12,674,977 B2
(45) Date of Patent: Jul. 7, 2026

(54) SYSTEMS AND METHODS FOR CALIBRATION OF COMPACT OPTICAL IMAGING SYSTEMS THAT USE SINGLE ATOM IMAGING

(71) Applicant: IonQ, Inc., College Park, MD (US)

(72) Inventors: Shantanu Debnath, Lanham, MD (US); Tan Liu, Frederick, MD (US)

(73) Assignee: IonQ, Inc., College Park, MD (US)

( * ) Notice: Subject to any disclaimer, the term of this patent is extended or adjusted under 35 U.S.C. 154(b) by 105 days.

(21) Appl. No.: 18/640,530

(22) Filed: Apr. 19, 2024

(65) Prior Publication Data

US 2024/0353679 A1      Oct. 24, 2024

Related U.S. Application Data

(60) Provisional application No. 63/497,343, filed on Apr. 20, 2023.

(51) Int. Cl.
*G02B 27/00* (2006.01)
*G06T 7/00* (2017.01)
*G06T 7/80* (2017.01)

(52) U.S. Cl.
CPC ........ *G02B 27/0025* (2013.01); *G06T 7/0002* (2013.01); *G06T 7/80* (2017.01); *G06T 2207/30168* (2013.01)

(58) Field of Classification Search
CPC .............................. G02B 27/0025; G06T 7/80
See application file for complete search history.

(56) References Cited

U.S. PATENT DOCUMENTS

| | | | |
|---|---|---|---|
| 2018/0372853 A1* | 12/2018 | Droz | G01S 17/89 |
| 2019/0064456 A1* | 2/2019 | Kim | G02B 6/4206 |
| 2023/0008842 A1* | 1/2023 | Dewald | G02B 15/14 |

* cited by examiner

*Primary Examiner* — Thanh Luu
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to calibrate compact optical imaging systems that use single atom imaging. A QIP system includes an optical system including an optical relay that receives a beam of light, a housing, and at least one aperture plate. The optical relay includes at least one lens, at least one mirror to fold the beam of light, and a camera sensor to capture at least one image of the beam of light. The housing accommodates the optical relay and includes a slot mechanically referenced to at least one of the lens(es) and the mirror(s). The aperture plate is receivable in the slot. The aperture plate includes an aperture alignable with an optical axis of the optical relay when the aperture plate is received in the slot.

15 Claims, 7 Drawing Sheets

SYSTEMS AND METHODS FOR CALIBRATION OF COMPACT OPTICAL IMAGING SYSTEMS THAT USE SINGLE ATOM IMAGING

CROSS-REFERENCE TO RELATED APPLICATION

This application claims the benefit of U.S. Provisional Patent Application No. 63/497,343, filed Apr. 20, 2023 and hereby incorporates by reference herein the contents of this application.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of systems and methods for calibration of compact optical imaging systems configured to use single ion imaging.

In some aspects, a method for calibrating an optical system of a quantum information processing (QIP) system includes receiving, by a camera sensor, a first image of a light beam emitted by an ion of a trapped ion chain; determining, based on the first image, that one or more optical aberrations are present; positioning an aperture plate including an aperture downstream of a component of the optical system; receiving, by the camera sensor, a second image of the light beam emitted by the ion of the trapped ion chain; and repositioning the component of the optical system based on the second image.

In some aspects, a quantum information processing (QIP) system includes an optical system, a housing, and at least one aperture plate. The optical system includes an optical relay configured to receive a beam of light. The optical relay includes a lens; a mirror configured to fold the beam of light; and a camera sensor configured to capture at least one image of the beam of light. The housing is configured to accommodate the optical relay, and includes a slot mechanically referenced to at least one of the lens and the mirror. The at least one aperture plate is configured to be received in the slot. The at least one aperture plate includes an aperture configured to be aligned with an optical axis of the optical relay when the at least one aperture plate is received in the slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
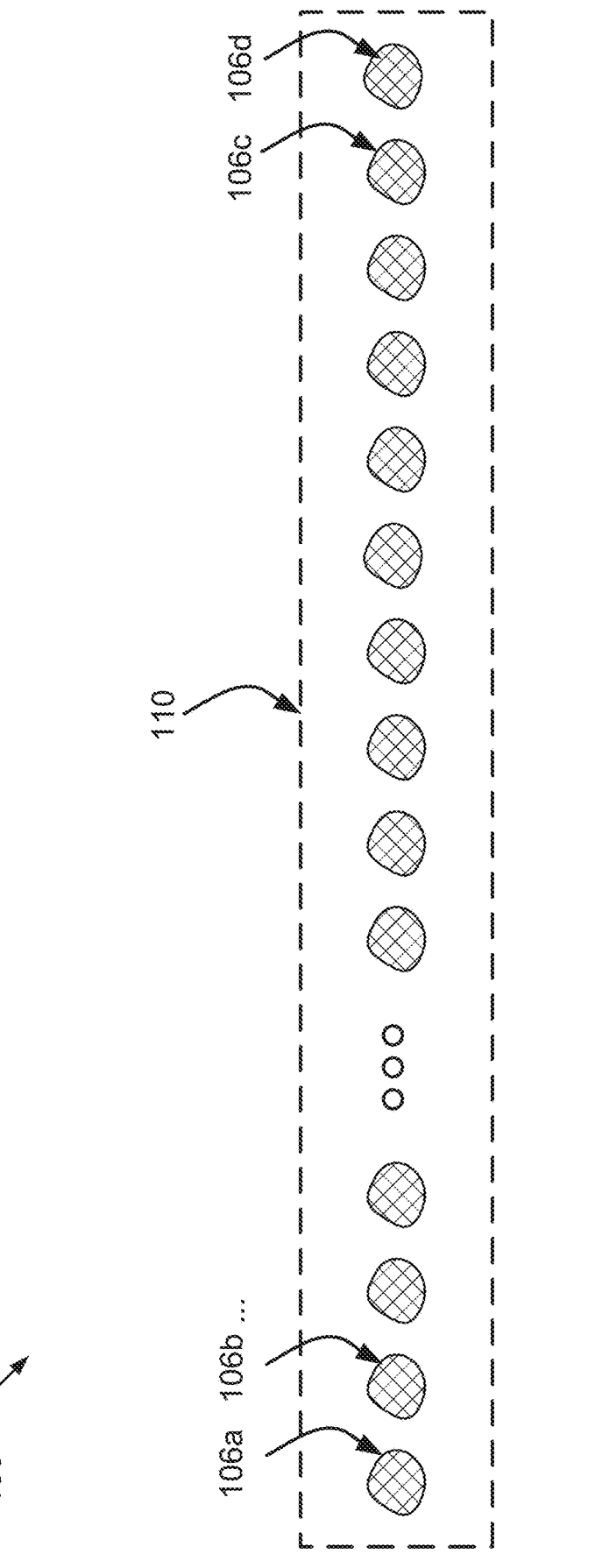
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well-known components.

Quantum information processing (QIP) systems are configured to detect light emitted by a single atom, for example a neutral atom or an ion. For example, the QIP system may be configured to collect the quantum-based fluorescence of individual atoms with a high-resolution imaging system, which typically includes one or more optical relays and a camera sensor. In such systems, it is advantageous to collect the highest numerical fraction of the fluorescence as possible using high numerical aperture (NA) optics, such as high NA objective lenses, in the optical relays such that one can perform fast detection with a high signal to noise ratio, which improves the state detection fidelity. However, high NA optics can introduce optical aberrations, which can lead to distortions of the images of the single atoms.

For example, QIP systems may include a linear chain of trapped ions. In such aspects, each of the trapped ions is a qubit that can be imaged onto camera sensors, such as individual optical fibers or a high efficiency camera, for qubit state detection. The detection fidelity of the camera sensor is determined based on the amount of collected light and optical aberrations introduced by components of the high-resolution imaging system.

Further, QIP systems often include one or more folding mirrors configured to fold the beam of light emitted by the single atom to reduce a footprint of the QIP system. However, as the number of mirrors used to fold the beam increases, it becomes more difficult to calibrate optical components of the system in order to optimize the amount of fluorescence collected by the camera sensor to attain diffraction limited performance.

For example, misalignment of the lens with respect to the imaged ion and/or the beam of collected ion fluorescence with respect to the optical elements of the imaging system can cause astigmatism, coma, and distortion aberrations in the captured image.

In another example, misalignment of the beam with one or more of the mirrors used to fold the beam can result in loss of a portion of the beam, which can cause vignetting aberrations. Vignetting can cause loss of signal because the lost portion of the beam does not reach the camera, resulting in an incomplete image.

The aberrations described above can be detrimental to the performance of the high-resolution imaging system, and can reduce the qubit detection fidelity of the high-resolution imaging system.

The amount of light emitted by a single atom is not bright enough to be detected by the human eye. Therefore, repositioning lenses and/or mirrors to align the beam with the lenses and/or mirrors is difficult.

Solutions to the issues described above are explained in more detail in connection with FIGS. 1-9, with FIGS. 1-3 providing a background of QIP systems or quantum computers, and more specifically, of atomic-based QIP systems or quantum computers.

Figure 2:
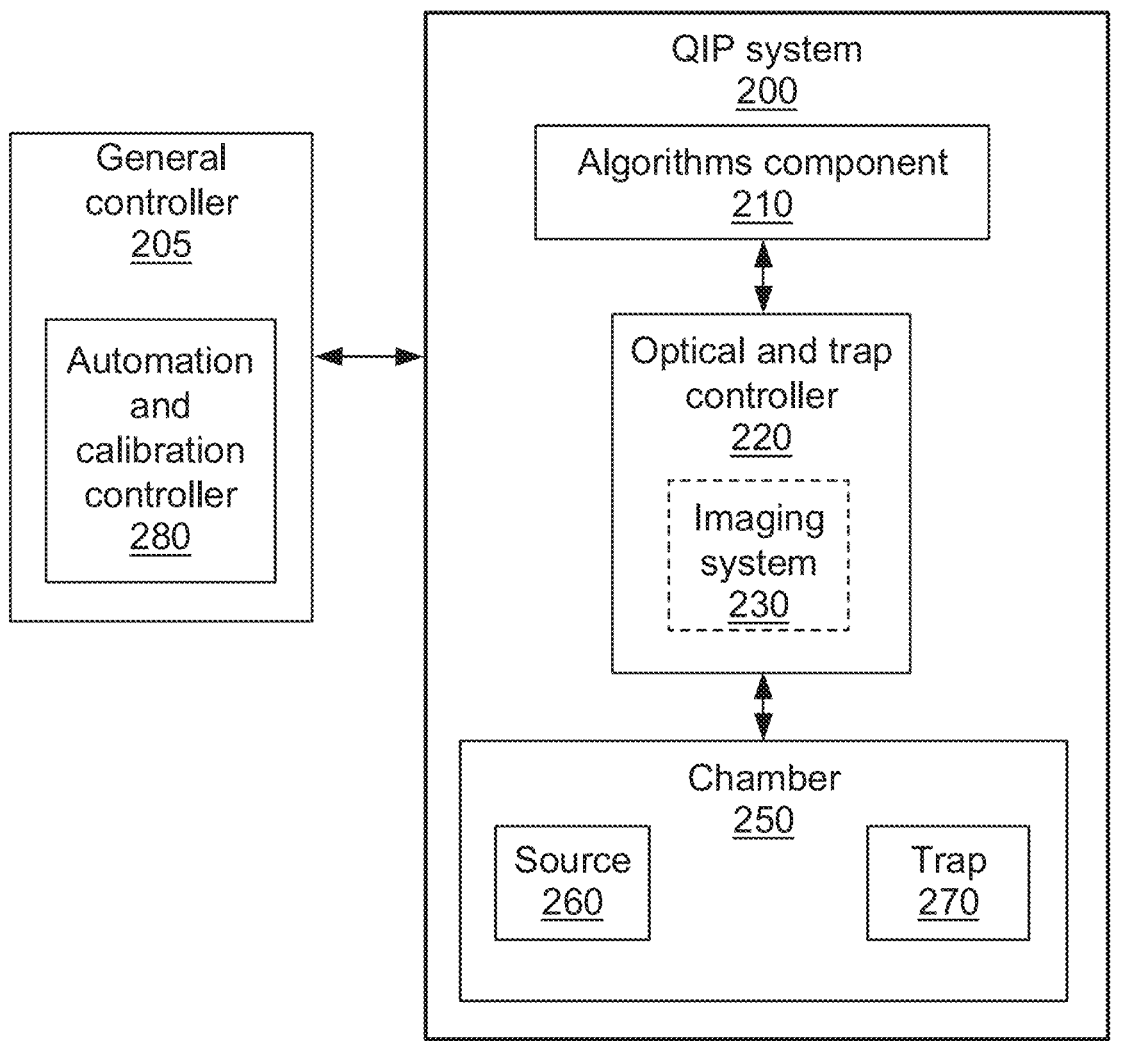
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facilitate such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the optical and trap controller 220, the optical systems, the optical components, the imaging system 230, and the ion trap 270.

Figure 3:
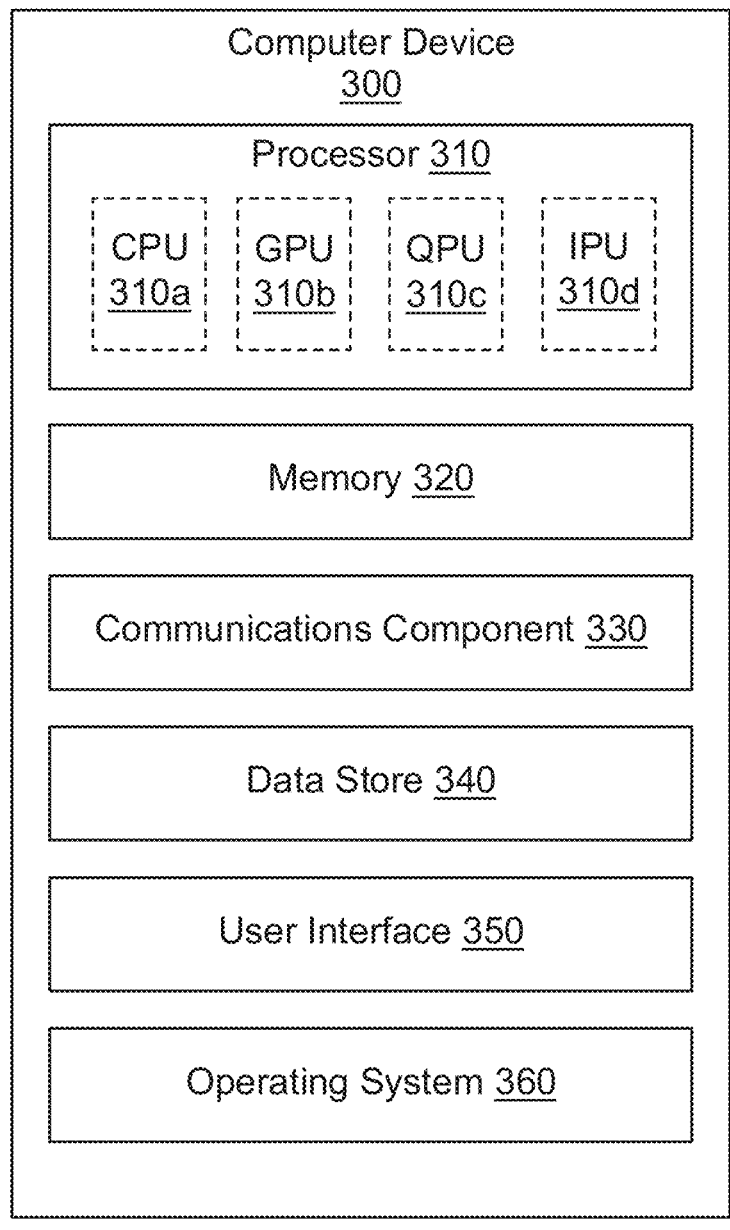
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, described below is a system and method for calibration, for example, by aligning, one or more optical relays of an optical system to reduce the effects of aberrations on light beams emitted by single ions of a trapped ion chain.

Figure 4:
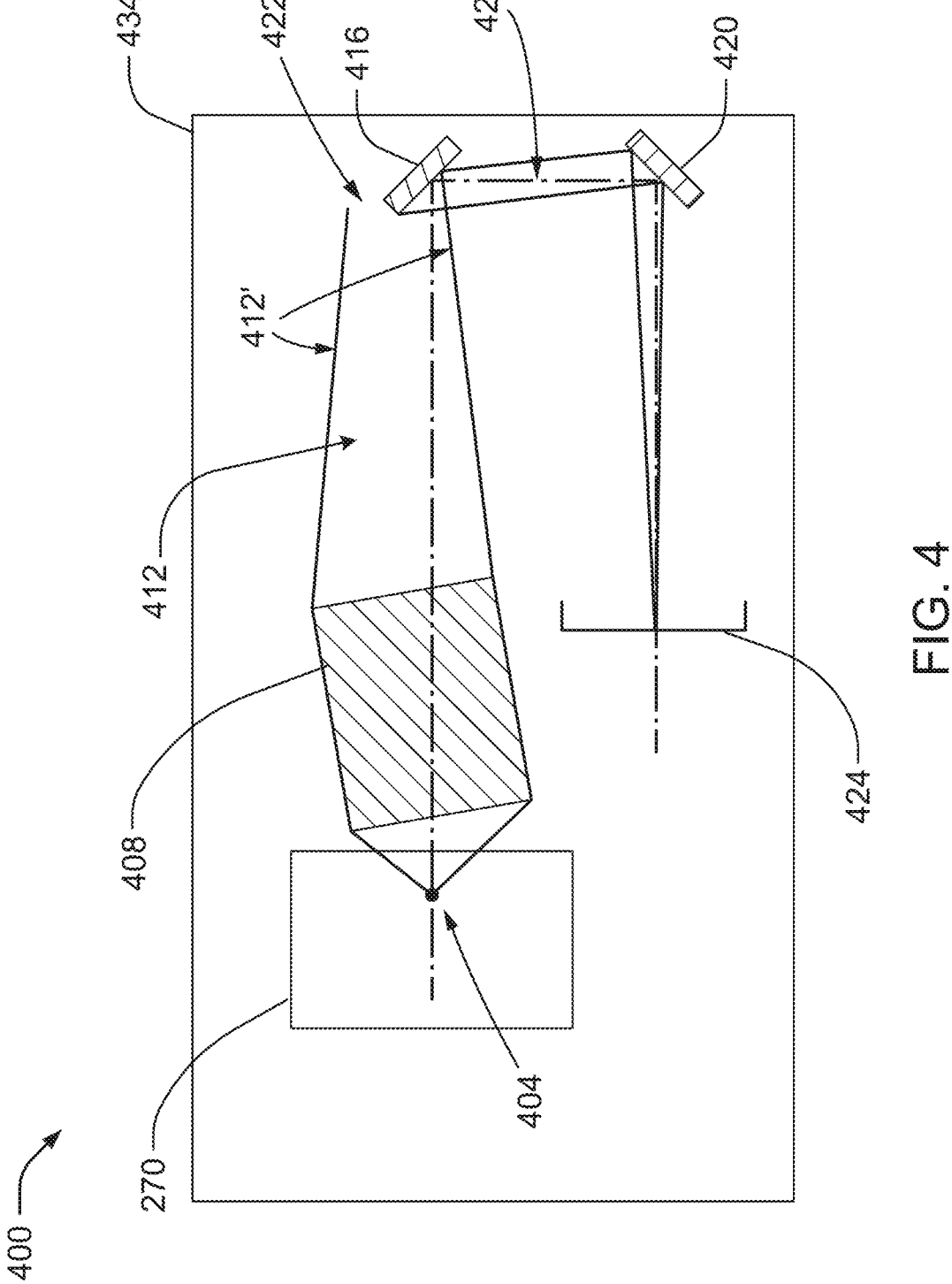
FIG. 4 illustrates an example schematic representation of a folded configuration of an optical relay of an optical system of the QIP system of FIG. 2 in accordance with aspects of this disclosure.
Figure 5:
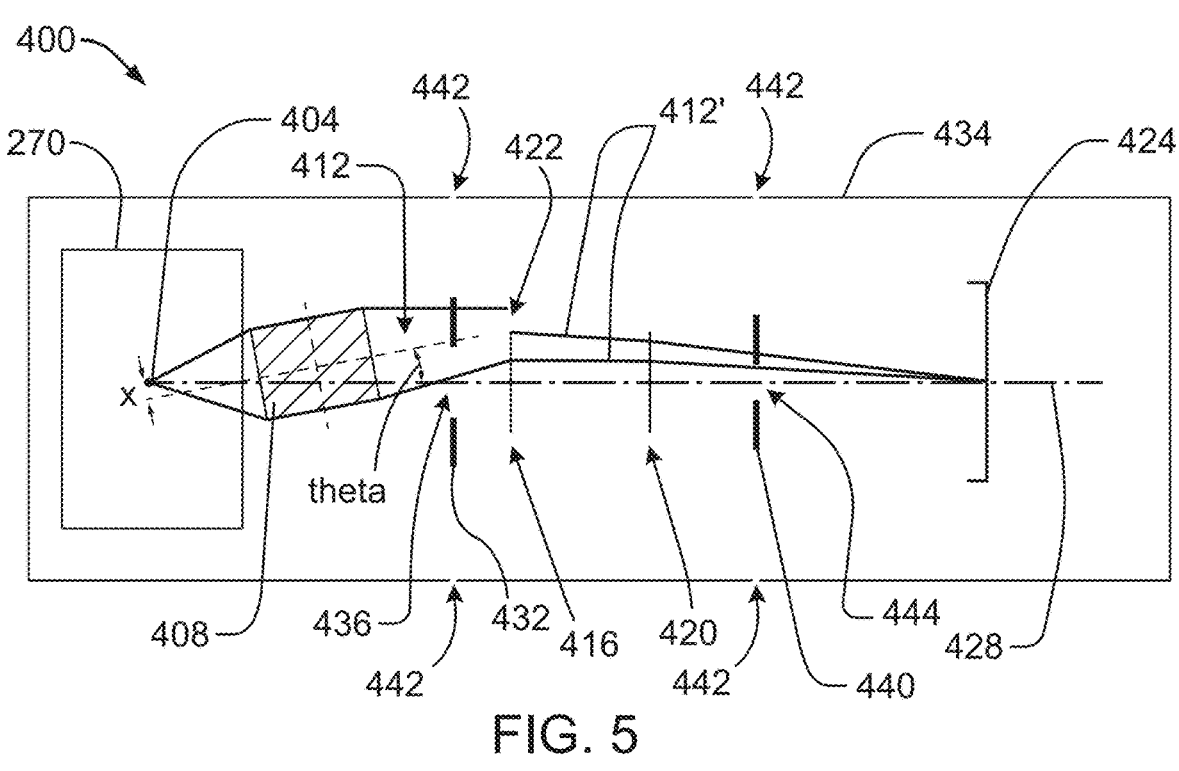
FIG. 5 illustrates an example alternative schematic representation of the folded configuration of the optical relay of FIG. 4 in accordance with aspects of this disclosure.

FIGS. 4 and 5 illustrate a schematic representation of an example optical relay 400 of the optical system according to the present disclosure. FIG. 4 shows the optical relay 400 in a folded configuration, and FIG. 5 shows the same optical relay 400 in an unfolded representation for simplicity. In some aspects, the optical relay 400 may include components controlled by the optical trap controller 220 and/or the calibration controller 280. In some aspects, the optical relay 400 may include components of the optical trap controller 220 and/or the calibration controller 280.

The optical relay 400 is configured as a single atom imaging system. As shown in FIGS. 4 and 5, a single ion (e.g., qubit) 404 of the ion trap 270 is aligned with one or more lenses 408 such that the beam 412 of light (e.g., fluorescence) emitted by the single ion 404 is aligned with/captured by the one or more lenses 408 at a high numerical aperture (NA) of the imaging system. The beam 412 is shown as the area between (and including) the marginal rays 412'. In some aspects, the one or more imaging lenses may include one lens 408, multiple lenses such as combinations of lenses configured to form a zoom lens and/or an objective lens. A first mirror 416 and a second mirror 420 are configured to fold the beam 412. Although two mirrors 416, 420 are shown in FIG. 4, in other configurations, the optical relay 400 may include more or fewer mirrors. The optical relay 400 is configured to focus the light emitted by the single ion 404 onto an image plane 424. In the illustrated aspect, a camera sensor, shown schematically as the image plane 424, is configured to collect and capture an image of the ion 404 by detecting the collected beam 412 close to the image plane 424. The camera sensor 424 is a high sensitivity camera sensor, such as a complementary metal-oxide semiconductor (CMOS) image sensor. One or more filters may be used in conjunction with the camera sensor 424 to remove light that is not emitted by the single ion 404. The one or more lenses 408, the first mirror 416, and the second mirror 420 are coupled to movable mounts, such that the one or more lenses 408, the first mirror 416, and the second mirror 420 can be repositioned.

Figure 7:
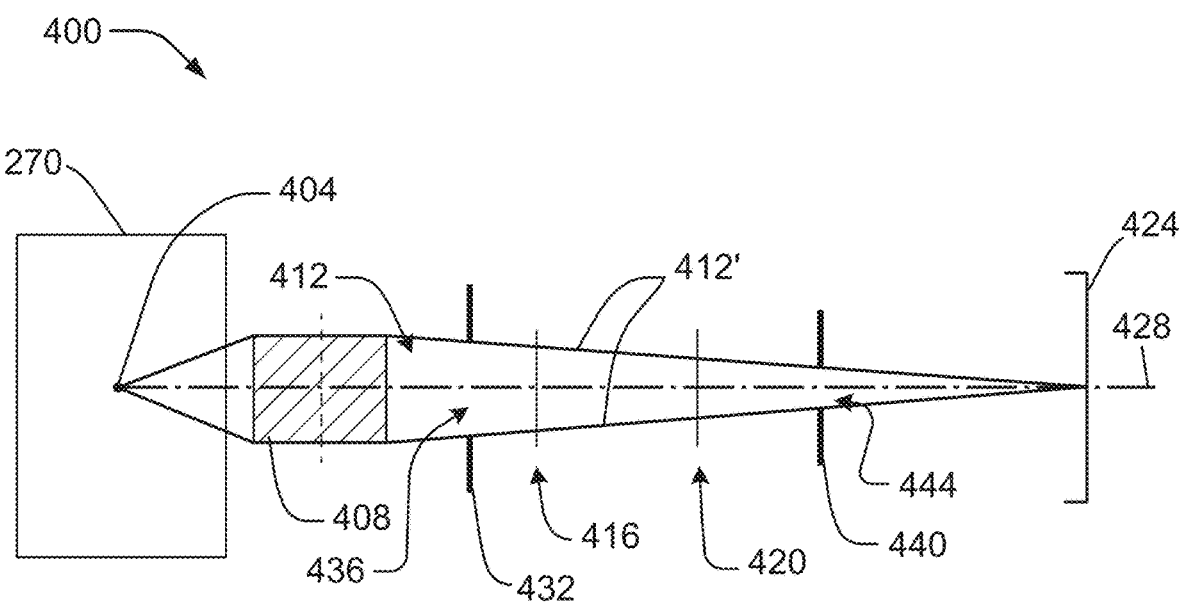
FIG. 7 illustrates an example schematic representation of the optical relay as illustrated in FIGS. 4 and 5 in another configuration in accordance with aspects of this disclosure.

An optical axis 428 of the system 400 is shown by a dash-dot line in FIG. 4. As indicated by the optical axis 428, the beam 412 of light emitted by the single ion 404 travels through the one or more lenses 408, is deflected by the mirrors 416, 420, and is collected by the camera sensor 424. When the components (e.g., the lens 408 and the mirrors 416, 420) of the optical relay 400 are properly aligned with the single ion 404, a center of the beam 412 of light emitted by the single ion 404 should be aligned with the optical axis 428 (FIG. 7).

As shown in FIG. 5, the optical axis of the lens 408 is misaligned relative to the optical axis 428 by a position of X (e.g., decentration misalignment) and an angle of theta (θ) (e.g. tilt misalignment). Therefore, the center of the beam 412 is not aligned with the optical axis 428. This misalignment of the lens 408 can cause aberrations such as coma, astigmatism, and distortion in the image captured by the camera sensor 424. Further, as shown in FIGS. 4 and 5, this misalignment of the lens 408 causes a portion 422 of the beam 412 to miss the first mirror 416 and the second mirror 420. Therefore, this missing portion of the beam 412 does not reach the camera sensor 240, causing a vignetting aberration in which a portion of the image corresponding to the missing portion of the beam is lost. Such a phenomenon is also called "clipping." The large deviation of the beam 412 from the optical axis shown in FIG. 4 indicates that both the lens 408 and the mirrors 416, 420 should be repositioned.

According to an example aspect, the mirrors 416, 420 and/or the lens 408 can be configured to be repositioned to improve the optical system calibration, for example by reducing the portion 422 of the beam 412 that is lost due to vignetting and/or reducing the amount of aberrations such as coma, astigmatism, distortion, and the like, for example. Vignetting aberrations can be difficult to measure because the mirrors 416, 420 in the optical relay 400 can be set in such a way that allows an image of the atom to appear at the center of the imaging plane that can be detected by the camera sensor 424, even though the collected light is significantly off-centered from the optical axis 428. In addition to determining that vignetting is occurring, it is advantageous to know where in the optical relay 400 the aberrations are likely occurring so that the appropriate mirror 416, 420 and/or the lens 408 can be repositioned. Since the beam 412 is emitted by a single ion, the beam 412 cannot be observed by the human eye, alignment (e.g., repositioning) of the one or more lenses 408, the first mirror 416, and the second mirror 420 is typically accomplished based on the image captured by the camera sensor 424. However, the camera sensor 424 is relatively large and bulky, so it would be difficult to reposition the camera sensor 424 at various positions along the optical relay 400 to identify the components at which aberrations occur.

For example, in order to correct vignetting error, it is advantageous to determine the position(s) along the optical relay 400 were the vignetting occurs. For example, it is advantageous to determine whether the vignetting is occurring at the lens 408, the mirrors 416, 420, and so forth. Therefore, one or more aperture plates 432, 440, 928, 936, 964, 972 (FIGS. 5, 9) can be positioned in an opto-mechanical housing 434 (FIGS. 4 and 5) including the components of the optical relay 400 (e.g., via one or more slots 442 in the opto-mechanical housing 434). Each of the aperture plates 432, 440, 928, 936, 964, 972 includes an aperture 436, 444, 932, 940, 968, 976 that is mechanically referenced to a designated location within the optical relay 400. As used herein, the phrase "mechanically referenced" means that a center of the aperture 436, 444, 932, 940, 968, 976 is configured to be aligned with the optical axis 428 when a particular aperture plate 432, 440, 928, 936, 964, 972 is positioned at a designated location within the optical relay 400. In some aspects, a diameter of the aperture 436, 440, 928, 936, 964, 972 is determined based on a predicted diameter of the beam 412 at the designated location of the optical relay 400 at which the aperture 436, 444, 932, 940, 968, 976 is positioned. In some aspects, the diameter of the aperture 436, 444, 932, 940, 968, 976 may be the same as the predicted diameter of the beam 412 at the designated location of the optical relay 400. In some aspects, the diameter of the aperture 436, 444, 932, 940, 968, 976 may be different (e.g., larger) than the predicted diameter of the beam 412 at the designated location of the optical relay 400.

Figure 6:
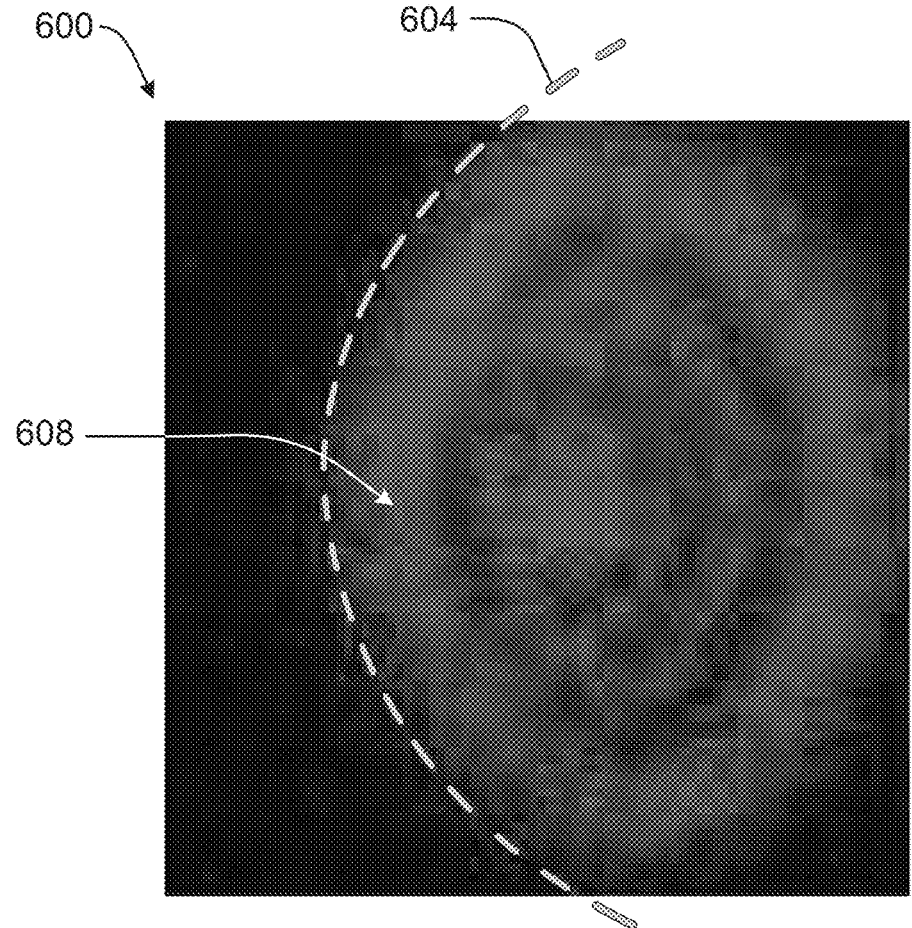
FIG. 6 illustrates an example image of an ion produced by the optical relay of FIGS. 4 and 5 in accordance with aspects of this disclosure.

For example, in order to determine whether the position of the lens 408 is causing at least a portion of the aberrations shown in FIG. 6, a first aperture plate 432 can be positioned along the optical relay 400 at a first position downstream of the lens 408 such that the first aperture 436 is aligned with the optical axis 428. If the image 600 captured by the camera sensor 424 shows a worsening of the aberrations after the first aperture plate 432 has been positioned at the first position, it is likely that the position of the lens 408 relative to the single ion 404 is causing at least a portion of the aberrations. Therefore, the position of the lens 408 can be adjusted to reduce at least a portion of the observed aberrations. That is, in an example aspect, both the decentration X and the tilt θ of the lens 408 can be repositioned. For example, as shown in FIG. 5, the lens 408 is misaligned by an amount X in a direction substantially transverse to the optical axis 428. The lens 408 is also tilted by an amount θ relative to the optical axis 428. Therefore, repositioning the lens 408 to compensate for decentration X and/or tilt θ can reduce vignetting, coma, astigmatism, and distortion aberrations caused by misalignment of the lens 408 and the single ion 404. In some aspects, in response to determining that repositioning the lens 408 is no longer reducing the observed aberrations in the image captured by the camera sensor 424, another first aperture (e.g., an aperture configured to be positioned at the first position) can be positioned along the optical relay 400 in the first position. In such an aspect, the other first aperture has a smaller diameter than the first aperture 436. In response to determining that the image 600 captured by the camera sensor 424 shows a worsening of the aberrations after the other first aperture 436 has been positioned at the first position, it is likely that the position of the lens 408 relative to the single ion 404 is still causing at least a portion of the aberrations. Therefore, the position of the lens 408 can continue to be adjusted (e.g., periodically or continuously) as described above.

FIG. 6 illustrates measurement and detection of vignetting of the collected beam of fluorescence where the defocused image 600 of an ion is partially clipped by a mechanically referenced aperture, such as, for example, the apertures 436, 444, 932, 940, 968, 976. An edge of the aperture can be observed in the image 600 and is shown as the dashed line 604. Since the edge of the aperture can be observed in the image 600, this indicates that the collected beam of fluorescence 412 is not aligned with optical axis 428.

As shown by the arrow 608, the image 600 includes the "vignetting" aberration, which indicates that the lens 408 misaligned relative to the optical axis 428. In some aspects, the image 600 can be produced by the optical relay 400 in the configuration illustrated in FIGS. 4 and 5. In order to determine whether the position of the first mirror 416 or the second mirror 420 is causing the vignetting aberration shown in FIG. 6, a second aperture plate 440 including a second aperture 444 can be positioned along the optical relay 400 at a second position in the optomechanical-housing 434 (e.g., a second slot 442) downstream of the mirrors 416, 420. If the image 600 captured by the camera sensor 424 shows a worsening of the aberrations after the second aperture plate 440 has been positioned at the second position, it is likely that the position of the mirrors 416, 420 relative to the single ion 404 is causing at least a portion of the aberrations. For example, the portion 422 of the beam 412 may be missing one or both of the mirrors 416, 420, as shown in FIG. 5. Therefore, the position of the mirrors 416, 420 can be adjusted to capture a larger portion of the beam 412. In some aspects, in response to determining that repositioning the mirrors 416, 420 is no longer reducing the vignetting aberrations, another second aperture can be positioned along the optical relay 400 in the second position. In such an aspect, the other second aperture has a smaller diameter than the second aperture 444. In response to determining that the image 600 captured by the camera sensor 424 shows a worsening of the aberrations after the other second aperture has been positioned at the second position, it is likely that the position of the mirrors 416, 420 relative to the single ion 404 is still causing at least a portion of the vignetting aberration. Therefore, the position of the mirrors 416, 420 can be adjusted as described above.

In the configuration illustrated in FIG. 5, the aperture plate 440 is positioned downstream of both the first mirror 416 and the second mirror 420. In other aspects, the second aperture plate 440 can be positioned between the first mirror 416 and the second mirror 420. In such aspects, any worsening of the aberrations in response to positioning the second aperture plate 440 in the second position are due to the position of the first mirror 416. The first mirror 416 can then be repositioned to capture more of the beam 412.

FIG. 7 illustrates a schematic representation of the example optical relay 400 after the lens 408 and the mirrors 416, 420 have been repositioned. As shown in FIG. 7, the beam 412 is aligned relative to the optical axis 428. The optical axis of the lens 408 is aligned relative to the optical axis 428. The beam 412 is substantially centered about the optical axis 428. The beam 412 is reflected by the mirrors 416, 420, thereby reducing or eliminating vignetting. The beam 412 passes through the first and second apertures 436, 444 without vignetting. In the embodiment illustrated in FIG. 7, a diameter of each of the first and second apertures 436, 444 is substantially the same as the diameter of the beam 412 at the first and second positions respectively. In other embodiments, the diameter of the first and second apertures 436, 444 may be larger than the diameter of the beam 412 at the first and second positions respectively.

Figure 8:
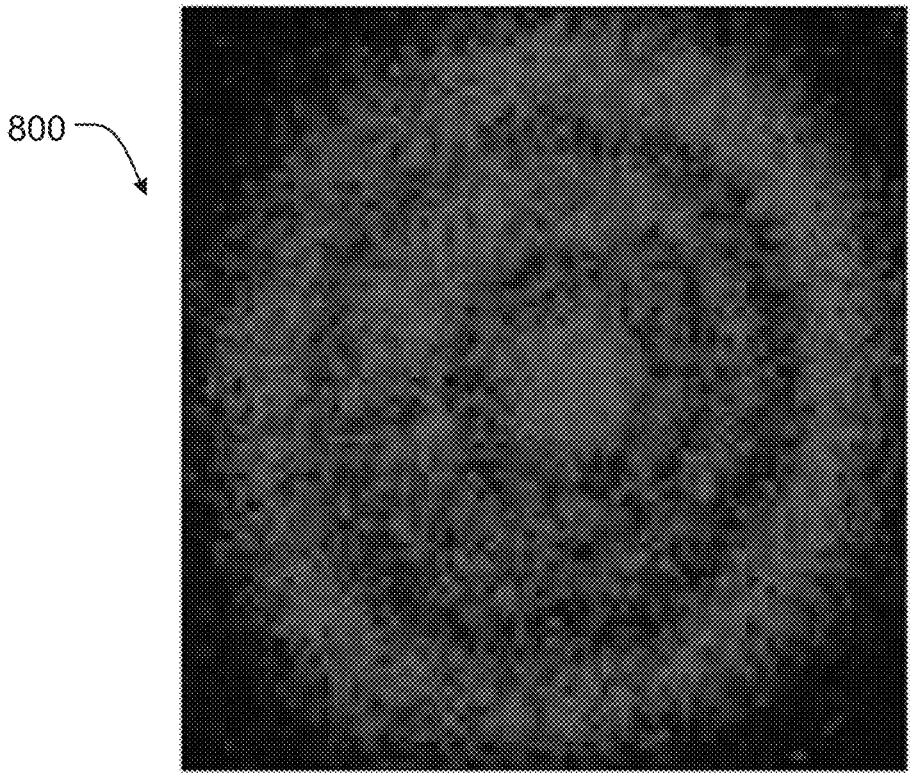
FIG. 8 illustrates an example image of an ion produced by the optical relay of FIG. 7 in accordance with aspects of this disclosure.

FIG. 8 illustrates an image 800 of the beam produced by the optical relay 400 after the lens 408 and the mirrors 416, 420 have been repositioned to yield the configuration illustrated in FIG. 7. As shown in FIG. 8, the image 800 is symmetric and does not show vignetting or haloing aberrations.

Figure 9:
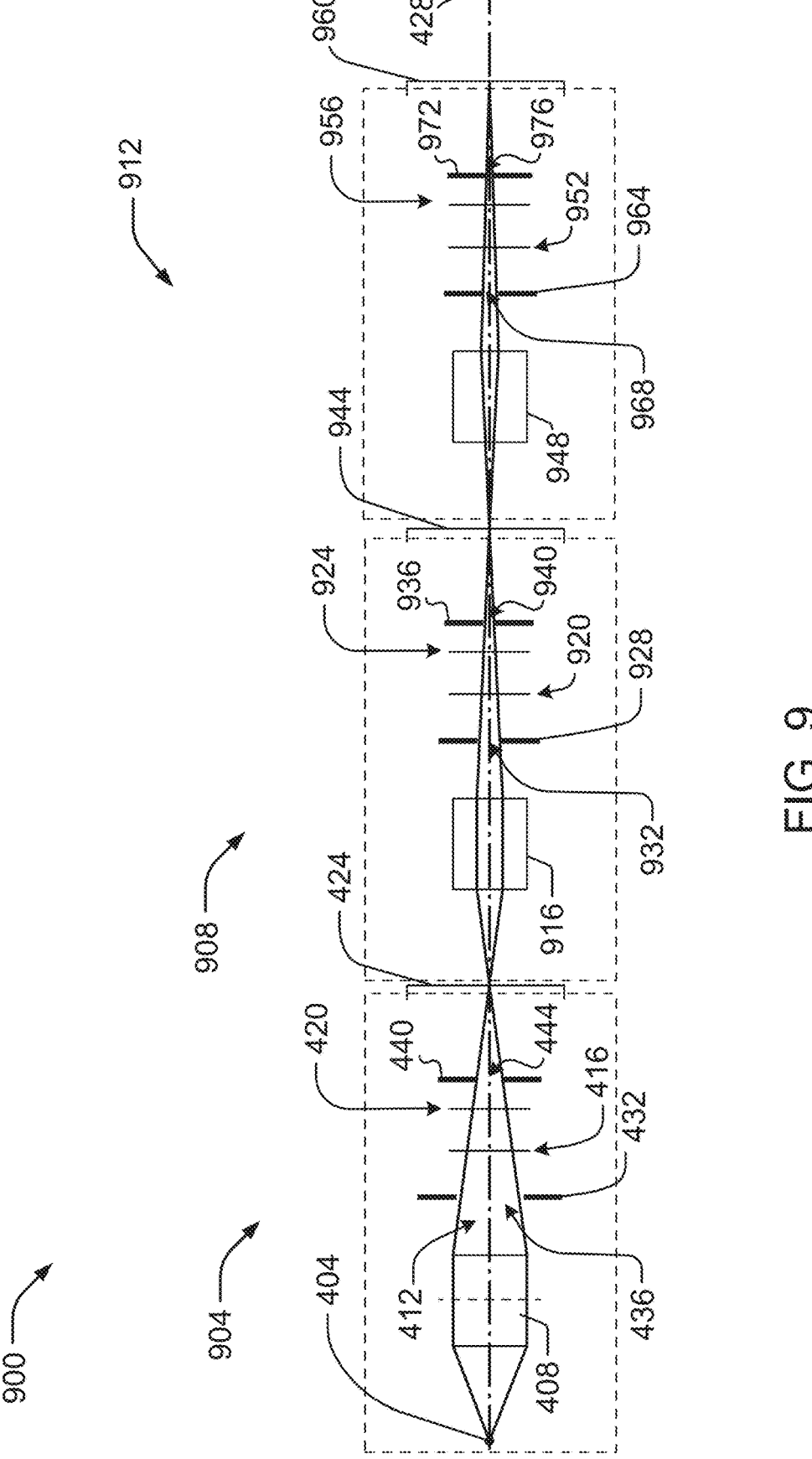
FIG. 9 illustrates an example schematic representation of an optical system including a plurality of optical relays of the QIP system of FIG. 2 in accordance with aspects of this disclosure.

FIG. 9 illustrates a schematic representation of an optical system 900 including multiple stages of relay imaging. In the illustrated configuration, the optical system 900 includes a first optical relay 904, a second optical relay 908, and a third optical relay 912. The first optical relay 904 is substantially the same as the optical relay 400. The same numbering is used for the components of the optical relay 904 as in the optical relay 400. However, in the configuration illustrated in FIG. 9, a camera sensor is positioned at the third image plane instead of the first image plane, as described in greater detail below. In the optical system 900, the first and second image planes 424, 944 are defined by the optical design and serve as mechanical references to help align the lenses and mirrors of each relay stage.

In the embodiment shown in FIG. 9, the second optical relay 908 includes an imaging lens 916, a first mirror 920, and a second mirror 924. In some aspects, the one or more imaging lenses may include one lens 916, multiple lenses such as combinations of lenses configured to form a zoom lens and/or an objective lens. The imaging lens 916 is aligned with the image plane 424 of the optical relay 400. The third and fourth mirrors 920, 924 are configured to fold the beam 412. In other configurations, the optical relay 908 may have more or fewer lenses or mirrors. The one or more lenses 916, the third mirror 920, and the fourth mirror 924 are coupled to movable mounts, such that the one or more lenses 916, the first mirror 920, and the second mirror 924 can be repositioned, as described above with regard to the one or more lenses 408, the first mirror 416, and the second mirror 420.

A third aperture plate 928 including a third aperture 932 can be positioned along the optical relay 908 at a third position downstream of the lens 916. The third aperture can be used to determine whether any aberrations in an image of the beam 412 captured by the camera sensor 424 are likely due to the lens 916. If so, the lens 916 can be repositioned to reduce the amount of aberrations in the image, as described above with the lens 408.

A fourth aperture plate 936 including a fourth aperture 940 can be positioned along the optical relay 908 at a fourth position downstream of the third and fourth mirrors 920, 924. The fourth aperture 940 can be used to determine whether any aberrations in an image of the beam 412 captured by the camera sensor 424 are likely due to relative position of the beam 412 and position of the third mirror 920 and/or the fourth mirror 924. If so, the third mirror 920 and/or the fourth mirror 924 can be repositioned to reduce the amount of aberrations in the image as described with regard to the first and second mirrors 416, 420. In some aspects, the fourth aperture plate 936 can be positioned between the third mirror 920 and the fourth mirror 924 to determine whether the third mirror 920 should be repositioned. In such aspects, another aperture may be positioned downstream of the fourth mirror 924.

With continued reference to FIG. 9, the third optical relay 912 includes an imaging lens 948, a fifth mirror 952, and a sixth mirror 956. In some aspects, the one or more imaging lenses may include one lens 948, multiple lenses such as combinations of lenses configured to form a zoom lens and/or an objective lens. The imaging lens 948 is aligned with an image plane 944 of the second optical relay 908. The fifth and sixth mirrors 952, 956 are configured to fold the beam 412. In other configurations, the third optical relay 912 may have more or fewer lenses or mirrors. A camera sensor 960, shown schematically as an image plane, is configured to collect the beam 412. The camera sensor 964 is substantially similar to the camera sensor 424 described above. The one or more lenses 948, the fifth mirror 952, and the sixth mirror 956 are coupled to movable mounts, such that the one or more lenses 948, the fifth mirror 952, and the sixth mirror 956 can be repositioned, as described with above with regard to the one or more lenses 408, the first mirror 416, and the second mirror 420 of the optical relay 400.

A fifth aperture plate 964 including a fifth aperture 968 can be positioned along the optical relay 912 at a fifth position downstream of the lens 948. The fifth aperture 968 can be used to determine whether any aberrations in an image of the beam 412 captured by the camera sensor 960 are likely due to the lens 948. If so, the lens 948 can be repositioned as described with regard to the lens 408 to reduce the amount of aberrations in the image.

A sixth aperture plate 972 including a sixth aperture 976 can be positioned along the optical relay 912 at a sixth position downstream of the fifth and sixth mirrors 952, 956. The sixth aperture 976 can be used to determine whether any aberrations in an image of the beam 412 captured by the camera sensor 960 are likely due to the third mirror 920 and/or the fourth mirror 924. If so, the third mirror 920 and/or the fourth mirror 924 can be repositioned to reduce the amount of aberrations in the image as described with regard to the first and second mirrors 416, 420. In some aspects, the sixth aperture 976 can be positioned between the fifth mirror 952 and the sixth mirror 956 to determine whether the fifth mirror 952 should be repositioned. In such aspects, another aperture may be positioned downstream of the sixth mirror 956.

The systems and methods described herein are advantageous for calibrating the lenses and/or mirrors in optical systems having multiple relays, such as the optical system 900, since such systems and methods allow for efficient determination of which particular lens(es) and/or mirror(s) should be repositioned to reduce optical aberrations in images of beams produced by single ions. When calibrating multi-relay optical systems, it is advantageous to start with the components in the optical relay closest to the ion 404 because the lens(es) in that relay produce the most magnification of the beam emitted by the single ion, and therefore have the highest Nas in the optical relay.

In some aspects, the image sensors 424, 960 may be in communication with one or more of the controllers of the QIP system 200, such as the general controller 205 and/or the optical and trap controller 220. The movable mounts of the lens(es) and the mirror(s) of the optical relays may also be in communication with one or more of the controllers of the QIP system 200, such as the general controller 205 and/or the optical and trap controller 220. In such aspects, the controller 205, 220 may be configured to identify one or more aberrations in an image captured by the camera sensor 424, 960. In response to an aperture plate being positioned in one of the slots 442, the controller 205, 220 may be configured to determine that the aberrations shown in a second image captured by the camera sensor 424, 960 have worsened. The controller 205, 220 may determine an amount to reposition one or more of the lens(es) and/or mirror(s) in the optical relay based on the second image. The controller 205, 220 may command the actuator(s) coupled to the lens(es) and/or mirrors in the optical relay by the determined amount. This process may be completed along the optical relay until the lens(es) and mirrors of the optical relay are calibrated.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for calibrating an optical system of a quantum information processing (QIP) system comprises:

receiving, by a camera sensor, a first image of a light beam emitted by an ion of a trapped ion chain;

determining, based on the first image, that one or more optical aberrations are present;

positioning a first aperture plate including a first aperture in a first position downstream of a first component of the optical system;

receiving, by the camera sensor, a second image of the light beam emitted by the ion of the trapped ion chain;

repositioning the first component of the optical system based on the second image;

positioning a second aperture plate in a second position downstream of a second component of the optical system, the second aperture plate including a second aperture;

receiving, by the camera sensor, a second image of the light beam emitted by the ion of the trapped ion chain; and repositioning the second component of the optical system based on the second image.

2. The method of claim 1, wherein the first component of the optical system is at least one lens or at least one mirror.

3. The method of claim 2, repositioning of the at least one lens corrects aberrations caused at least by decentration X.

4. The method of claim 2, wherein repositioning the at least one lens corrects aberrations caused at least by tilt.

5. The method of claim 1, wherein the beam of light is emitted by a single ion of a trapped chain of ions of the QIP system.

6. The method of claim 1, wherein a diameter of the first aperture at a designated location is substantially the same as the diameter of the beam at the designated location.

7. The method of claim 1, wherein the second component is downstream of the first position.

8. The method of claim 1, wherein a diameter of the first aperture of the first aperture plate has a first diameter and the second aperture of the second aperture plate has a second diameter different than the first diameter.

9. A quantum information processing (QIP) system comprising:

an optical system comprising:

an optical relay configured to receive a beam of light, the optical relay comprising:

at least one lens;

at least one mirror configured to fold the beam of light; and a camera sensor configured to capture at least one image of the beam of light;

a housing configured to accommodate the optical relay and including a first slot mechanically referenced to at least one of the at least one lens and the at least one mirror and a second slot mechanically referenced to the other of the at least one lens and the at least one mirror; and a first aperture plate configured to be received in the first slot, the first aperture plate including a first aperture configured to be aligned with an optical axis of the optical relay when the first aperture plate is received in the first slot; and a second aperture plate including a second aperture and configured to be received in the second slot.

10. The QIP system of claim 9, wherein the beam of light is emitted by a single ion of a trapped chain of ions of the QIP system.

11. The QIP system of claim 9, wherein the at least one lens and the at least one mirror are configured to be repositionable relative to the housing.

12. The QIP system of claim 11, wherein the at least one lens is configured to be repositioned to correct aberrations caused at least by decentration X.

13. The QIP system of claim 11, wherein the at least one lens is configured to be repositioned to correct aberrations caused at least by tilt.

14. The QIP system of claim 9, wherein a diameter of the first aperture of the first aperture plate has a first diameter and the second aperture of the second aperture plate has a second diameter different than the first diameter.

15. A quantum information processing (QIP) system comprising:

an optical system comprising;

an optical relay configured to receive a beam of light, the optical relay comprising:

at least one lens;

at least one mirror configured to fold the beam of light; and a camera sensor configured to capture at least one image of the beam of light;

a housing configured to accommodate the optical relay and including a slot mechanically referenced to at least one of the at least one lens and the at least one mirror; and at least one aperture plate configured to be received in the slot, the at least one aperture plate including an aperture configured to be aligned with an optical axis of the optical relay when the at least one aperture plate is received in the slot, wherein a diameter of the aperture at a designated location is substantially the same as a diameter of the beam at the designated location.

\* \* \* \* \*